United States Patent [19]
West et al.

[11] Patent Number: 5,831,597
[45] Date of Patent: Nov. 3, 1998

[54] COMPUTER INPUT DEVICE FOR USE IN CONJUNCTION WITH A MOUSE INPUT DEVICE

[75] Inventors: Michael S. West, Austin, Tex.; Jennifer S. Nyland, North Vancouver; Mitchell G. Burton, Coquitlam, both of Canada

[73] Assignee: Tanisys Technology, Inc., Austin, Tex.

[21] Appl. No.: 653,589

[22] Filed: May 24, 1996

[51] Int. Cl.$^6$ ................................................. G09G 5/00
[52] U.S. Cl. ........................ 345/163; 345/174; 345/156
[58] Field of Search .................................. 345/156–158, 345/163–166, 173, 174; 248/918

[56] References Cited

U.S. PATENT DOCUMENTS

| | | | |
|---|---|---|---|
| D. 352,278 | 11/1994 | Sharpe, III et al. | D14/100 |
| 4,799,054 | 1/1989 | House | 340/710 |
| 4,989,819 | 2/1991 | Sigler | 248/476 |
| 5,022,170 | 6/1991 | House | 40/358 |
| 5,217,781 | 6/1993 | Kuipers | 428/85 |
| 5,231,380 | 7/1993 | Logan | 340/706 |
| 5,365,461 | 11/1994 | Stein et al. | 364/550 |
| 5,405,168 | 4/1995 | Holt | 281/2 |
| 5,414,420 | 5/1995 | Puckette et al. | 341/20 |
| 5,463,388 | 10/1995 | Bale et al. | 341/33 |

Primary Examiner—Steven J. Saras
Assistant Examiner—Vincent Kovalick

[57] ABSTRACT

A computer input device is used in conjunction with a mouse input device. The computer input device of the invention comprises a body having a resilient layer covered by a surface layer textured throughout the entirety of the surface for operation of the mouse. A printed circuit card is incorporated in the body between the resilient layer and the upper surface layer and includes a plurality of capacitive touch sensor pads. The card further includes electronic circuitry for operating the touch sensor pads to detect when a capacitive object, such as a fingertip, is in the proximity of a sensor pad. A touch need not apply force to register. The printed circuit card includes a guard ring pad surrounding the touch pads which detects the presence of the mouse over the sensor pads and indicates that any detected outputs from the sensor pads are not valid, but instead are due to the presence of the mouse. The mouse can operate over the entirety of the surface of the device without interruption, including over the capacitive sensor pads. The input device can be connected to a personal computer through a mouse port, a keyboard port, a universal serial bus or any other available port of the computer. Other computer system components, such as a keyboard or mouse, can be connected directly or indirectly through this input device.

27 Claims, 6 Drawing Sheets

COMPUTER INPUT DEVICE FOR USE IN CONJUNCTION WITH A MOUSE INPUT DEVICE

TECHNICAL FIELD OF THE INVENTION

The present invention pertains in general to input devices for personal computers, and in particular to such a device which concurrently serves as a pad for supporting a mouse input device.

BACKGROUND OF THE INVENTION

The most widely used input device for personal computers, other than a keyboard, is a mouse. This is a device that is translated laterally on a planar surface by the user to produce distance and direction inputs for computer programs. Principally, the mouse inputs are used for directing a cursor to a particular location on a screen. The user then presses a key on the mouse to indicate execution at the located point. The most commonly used mouse input devices have a roller ball that rotates when the mouse is moved laterally. For proper operation of the mouse, it is important that the roller ball be placed on an appropriate surface having proper texture to provide rolling friction for the roller ball. It is difficult to properly use a mouse when placed on a glass or hard surface. Thus, most mouse input devices are operated on what is termed a mouse pad. The mouse pad has a carefully textured upper surface and a resilient body to obtain maximum traction for the roller ball and thereby provide the most accurate input by the user to the program.

There is a recurring need in the usage of personal computers for easier and simpler techniques for providing user input into the computer. One such method is to provide programmable key inputs through a touch sensor connected to the keyboard input of the computer. Such a system is described in PCT application 9423356 to Blair, et al. The use of additional input devices to a personal computer, however desirable, is severely restricted by the availability of input ports to the computer and the availability of desk top space for placing the additional input devices. The combination of a keyboard, mouse pad and other related devices usually leaves little remaining work space available for additional input devices. Thus, there exists a need for an apparatus which can provide more user programmable inputs to a computer without requiring additional input ports to the computer or using additional desk space.

SUMMARY OF THE INVENTION

A selected embodiment of the present invention is a computer input device which is used in conjunction with a hand-controlled mouse input device. The computer input device is connected to an input port of a computer. The device includes a multi-layer body having at least one layer comprising a resilient material. The device includes a planar upper surface layer which receives the mouse and permits the mouse to operate on the entire surface of the device. A plurality of capacitive touch sensors are positioned within the body of the device below the planar upper surface area. An electronic circuit is located in the body of the device and connected to the capacitive touch sensors for detecting when a capacitive body, such as a fingertip, comes into proximity to any one of the touch sensors. The electronic circuit then generates a touch signal corresponding to the touch sensor being touched. The device further includes a communication link for connecting the electronic circuit to a port of the computer for conveying the touch signals to the computer.

BRIEF DESCRIPTION OF THE DRAWINGS

For a more complete understanding of the present invention and the advantages thereof reference is now made to the following description taken in conjunction with the accompanying drawings in which.

DETAILED DESCRIPTION

The present invention provides an easy and convenient method and apparatus for providing user inputs to a computer. One of the most widely-used devices, other than a keyboard, for providing user input to a computer is termed a "mouse." This is a computer input device that the user translates laterally over a surface termed a mouse pad to provide distance and directional information into the user's programs. The mouse device further includes buttons which are pressed to provide signal inputs to the computer software. The pad on which the mouse rides requires a slightly textured surface to ensure that the mouse roller proportionately rolls as the mouse device is moved about the pad. Almost every user of a mouse device has a mouse pad at the user's desk or work station. The present invention provides touch switches in a body that has a surface usable with a mouse input device thereby providing additional functionality to a user without requiring additional equipment space.

Figure 1:
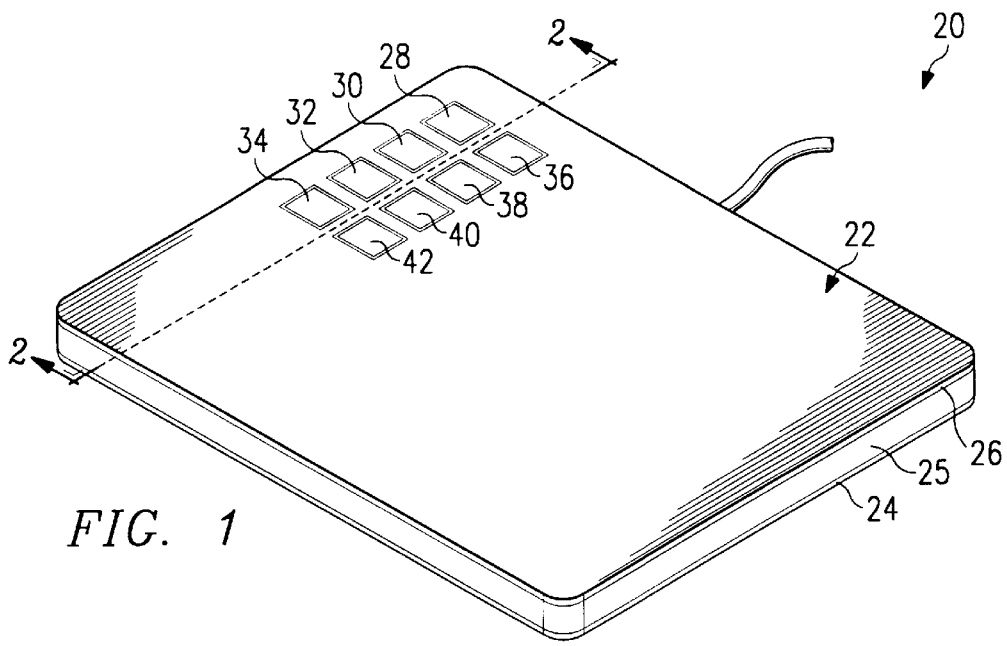
FIG. 1 is a perspective view of a computer input device having a mouse pad surface and capacitive touch switches in accordance with the present invention.

Referring to FIG. 1, there is illustrated a computer input device 20 in accordance with the present invention. Device 20 has a body 22 which comprises a base layer 24 made of a resilient material, such as neoprene. The base layer 24 provides both a resilient cushion as well as a non-skid bottom surface. Body 22 includes a middle layer 25 which is a relatively stiff plastic sheet that is approximately the same thickness as that of a printed circuit card and components. The layer 25 provides limited rigidity to the body 22. The body 22 further includes an upper surface layer 26 over layer 25. Layer 26 comprises a thin planar layer of material such as vinyl which has an appropriate texture for ensuring the proper operation of a mouse input device as it is rolled across the surface of the body 22. Layer 26 can be a layer of cloth or a plastic layer imprinted with a finely-defined texture to ensure proper rolling of the ball within the mouse. Dimensions for a selected embodiment of the body 24 are, for example, nine inches long by seven and a half inches wide by one quarter inch thick. The majority of the thickness comprises the middle layer 25. The shape and size of the body 22 can be varied to meet a user's requirements.

The layers 24, 25 and 26 are glued together to provide structural integrity for the device 20.

The device 20 has printed on the top surface of the layer 26 a set of eight markers in four rows and two columns. The left column consists of markers 28, 30, 32 and 34 and the right column consists of markers 36, 38, 40 and 42. These printed markers are positioned over corresponding capacitive touch sensors, as described below. The markers 28–42 do not alter the texture of the upper surface of layer 26 so that the mouse device operates just as well over the markers 28—42 as at any other portion of the upper surface of body 22. The markers can be of any shape, color or configuration.

Although an arrangement is shown with two columns and four rows of touch sensors on the left side of the body 22, these may be any number or configuration of touch sensors at any location on the body 22.

Figure 2:
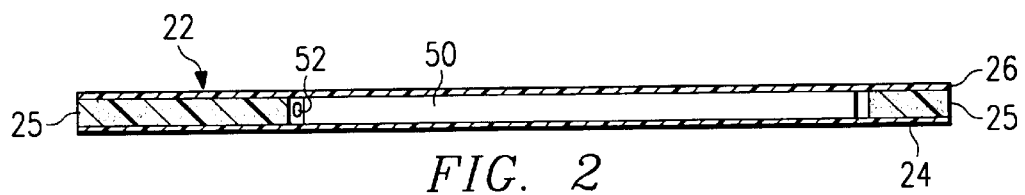
FIG. 2 is a section view of the input device shown in FIG. 1 taken along the lines 2—2.

FIG. 2 is a sectional view along lines 2—2 of the computer input device 20 shown in FIG. 1. The middle layer 25 is cut out to form an opening that receives a printed circuit card 50. A cable 52 is connected to the lower end of the printed circuit card 50 and feeds through a cut-out groove in the layer 25. The card 50 may be made of either rigid or flexible material.

Figure 3:
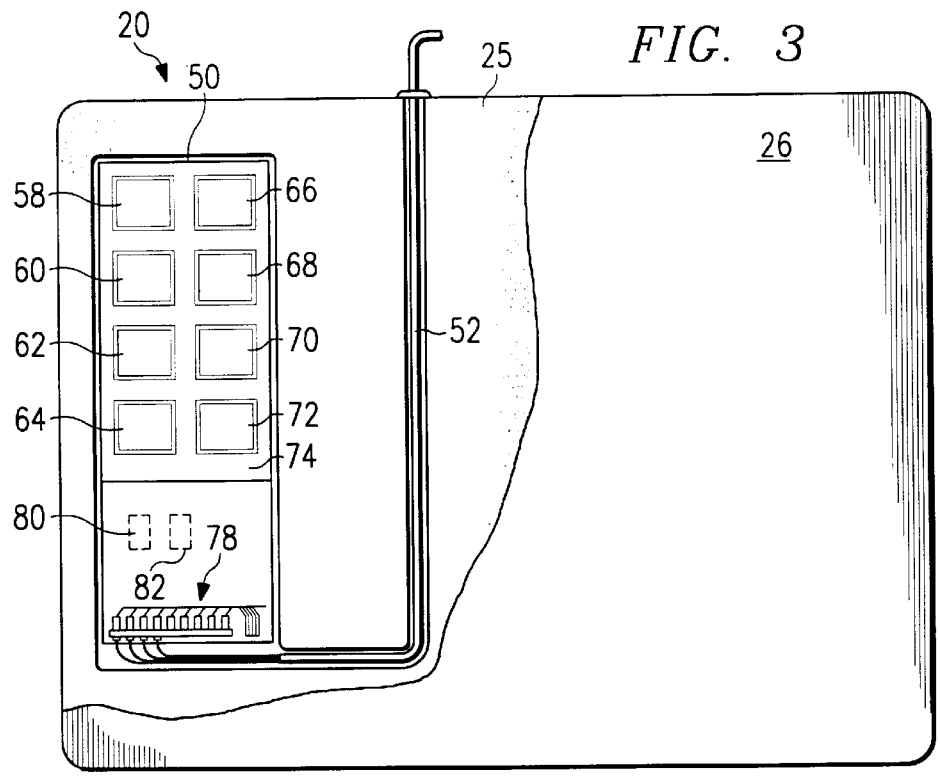
FIG. 3 is a partially cut-away view of the computer input device shown in FIG. 1 illustrating the position of a printed circuit card with capacitive touch sensors and a cable.

Referring now to FIG. 3, there is shown a partial cut-away view of the device 20. The layer 26 is cut away to show the printed circuit card 50 and cable 52 which are positioned in cut-outs of the layer 25. The upper (illustrated) surface of the printed circuit card 50 is etched to form a set of capacitive touch sensor pads 58, 60, 62, 64, 66, 68, 70 and 72. Each of these sensor pads comprises a discrete square of an etched copper layer over a dielectric substrate. There is further provided a guard ring pad 74 which is also a layer of copper. Pad 74 is formed in a shape to extend completely around all of the sensors 58–72 as well as to have a narrow strip of copper extending between the two columns and between all of the rows of the sensors 58–72.

Printed circuit card 50 has a series of tabs 78 formed at one end thereof for connecting to six lines and a shield line of the cable 52. Electronic components comprising a microprocessor 80 and a multiplexer 82 are mounted on the opposite (bottom) side of the printed circuit card 50 to provide the electronic operations necessary for the capacitive sense touching of the sensor pads 58–74.

The capacitive touch sensor pads 58–72 are positioned directly beneath the corresponding markers 28–42. For example, the marker 28 is located immediately above the sensor pad 58. Therefore, when a user touches the marker 28, which is a part of the surface layer 26, the user is then bringing a fingertip in close proximity to the capacitive sensor 58. The capacitance of a fingertip alters the capacitance of a sensor pad. Each of the remaining markers likewise corresponds to a respective capacitive touch sensor on the printed circuit card 50. The user need not apply any force to the marker to register a touch and therefore does not need to deform any member as would be required, for example, with a membrane switch.

Figure 4:
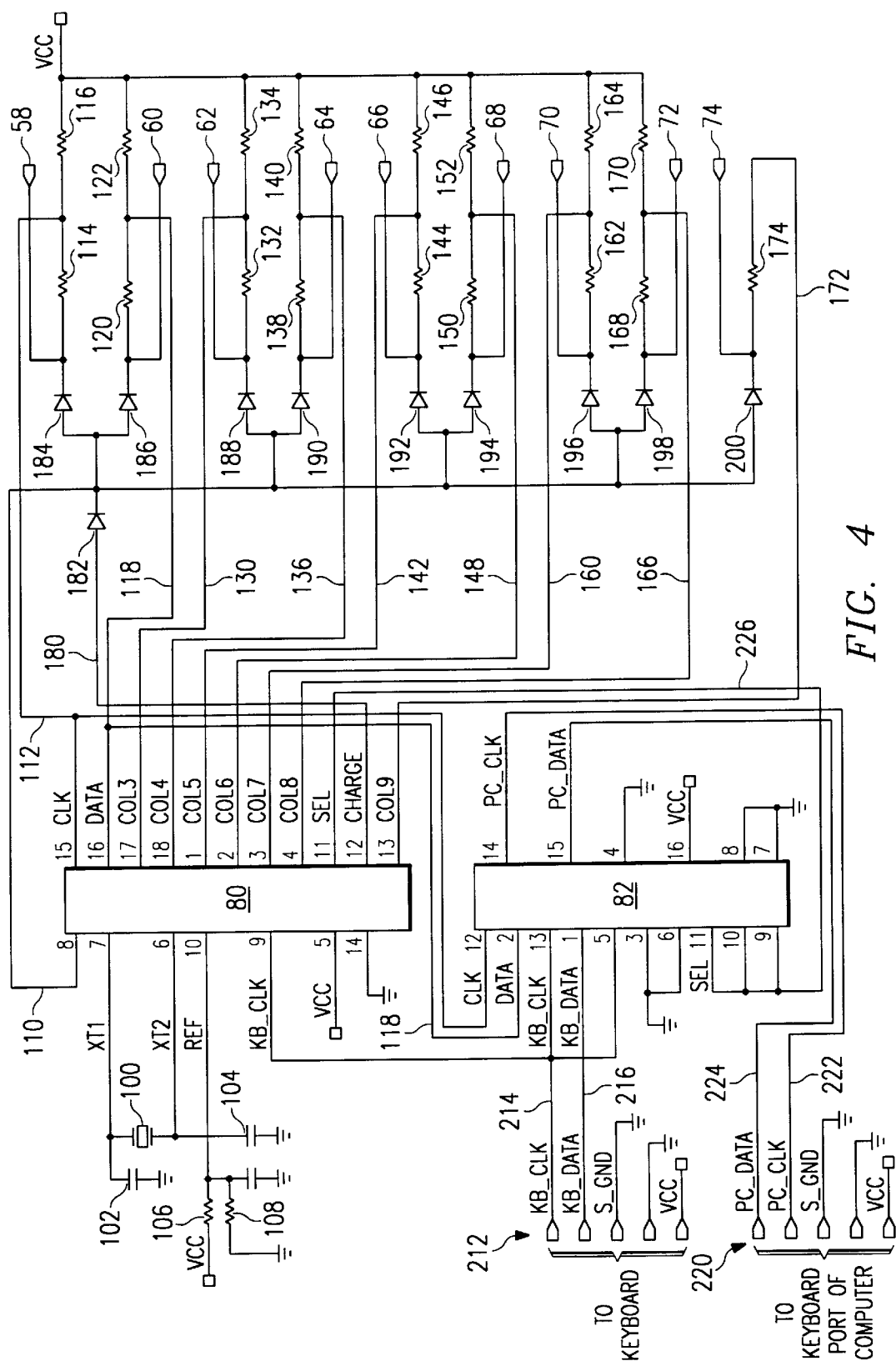
FIG. 4 is a schematic diagram of an electronic circuit for operation of the capacitive touch sensors shown in FIGS. 1–3.

A schematic diagram for the electronic circuit mounted on the printed circuit card 50 is shown in FIG. 4. Two of the components in this circuit include the microprocessor 80, which is preferably a Zilog model Z8, which is well known in the industry, and a multiplexer 82, which preferably is a model 4053. The operation of the microprocessor 80 in general is to charge all of the sensor pads 58–74 and then to sequentially discharge each pad to measure the time required for discharge. The time of discharge is compared to a previously stored time to determine whether a capacitive object, such as a fingertip, has been placed in proximity to a sensor pad.

The multiplexer 82 provides a connection between the keyboard and the keyboard port of the user's computer as well as a connection between the sensor circuit and the keyboard port of the computer.

Further referring to FIG. 4, a clock signal for the microprocessor 80 is generated by the combination of a crystal 100 and capacitors 102 and 104. These elements can be replaced by a resonator with built-in capacitors or by a precision RC circuit. A threshold voltage is produced at the junction of resistors 106 and 108 which are connected between $V_{cc}$, which preferably is 5.0 volts, and ground. The selected threshold voltage is approximately 1.2 volts.

A detection line 110 is connected to pin 8 of the microprocessor 80. This pin is connected to an internal voltage comparator which compares the voltage at this pin to the reference threshold voltage at pin 10.

A line 112, which functions as a column line, is connected to pin 15 of the microprocessor 80 as well as to the junction between resistors 114 and 116. The resistors 114 and 116 are connected in series between $V_{cc}$ and sensor pad 58. Line 112 also serves as a clock line as described below.

A line 118, which functions as a column line, is connected to pin 16 of microprocessor 80 as well as to the junction of resistors 120 and 122. Line 118 also serves as a data line as described below. Resistors 120 and 122 are connected between $V_{cc}$ and sensor pad 60.

A column line 130 is connected to pin 17 of the microprocessor 80 and to the junction of resistors 132 and 134 which are connected between $V_{cc}$ and pad 62.

A line 136 is connected to pin 18 of microprocessor 80 as well as to the junction of resistors 138 and 140 which are connected in series between $V_{cc}$ and sensor pad 64.

A line 142 is connected to pin 1 of microprocessor 80 and to the junction of resistors 144 and 146 which are connected in series between $V_{cc}$ and the sensor pad 66. A line 148 is connected to pin 2 of microprocessor 80 and to the junction of resistors 150 and 152 which are connected in series between $V_{cc}$ and the sensor pad 68.

A line 160 is connected to terminal 3 of microprocessor 80 and to the junction of resistors 162 and 164 which are connected in series between $V_{cc}$ and the sensor pad 70. A line 166 is connected to pin 4 of microprocessor 80 and to the junction of resistors 168 and 170.

A line 172 is connected between pin 13 of the microprocessor 80 and a first terminal of a resistor 174, which has the second terminal thereof connected to sensor pad 74.

A line 180 is connected to the charge pin 12 of microprocessor 80 and further connected to the anode terminal of a diode 182. The cathode terminal of diode 182 is connected to the detector line 110. Diodes 184 and 186 are connected respectively from line 110 to sensor pads 58 and 60. Diodes 188 and 190 are connected between detector line 110 and sensor pads 62 and 64, respectively. Diodes 192 and 194 are connected respectively between line 110 and sensor pads 66 and 68. Diodes 196 and 198 are connected respectively between line 110 and sensor pads 70 and 72. A diode 200 is connected between detector line 110 and sensor pad 74.

Each of the resistors 114, 120, 132, 138, 144, 150, 162, 168 and 174 preferably has a resistance of 1M ohms. Each of the resistors 116, 122, 134, 140, 146, 152, 164 and 170 preferably has a resistance of 2.2K ohms.

A set of terminals 212 are connected to a keyboard of a conventional personal computer. A keyboard clock line 214 is connected to pin 9 of the microprocessor 80 as well as to the pin 13 of the multiplexer 82. A line 216 carries keyboard data and this line is connected to pin 1 of the multiplexer 82. The pads 212 further include a shield ground, a signal ground as well as a power terminal $V_{cc}$.

A set of terminal pads 220 are connected to the conventional keyboard port of a personal computer. A personal computer clock line 222 is connected to pin 14 of multiplexer 82. A personal computer data line 224 is connected to pin 15 of multiplexer 82. The terminals 220 further include a shield cable ground, a signal ground and a power terminal $V_{cc}$.

The microprocessor 80 has a select pin 11 which is connected through a line 226 to select pins 9, 10 and 11 of multiplexer 82. Signals on this line selectively connect either the terminals 212 to the terminals 220 or transmit data from the microprocessor 80 via the line 118 to the multiplexer 82 and further to the keyboard port of the computer through terminals 220 while also transmitting the clock signals through line 112 to the multiplexer 82 and to the terminals 220.

Figure 5:
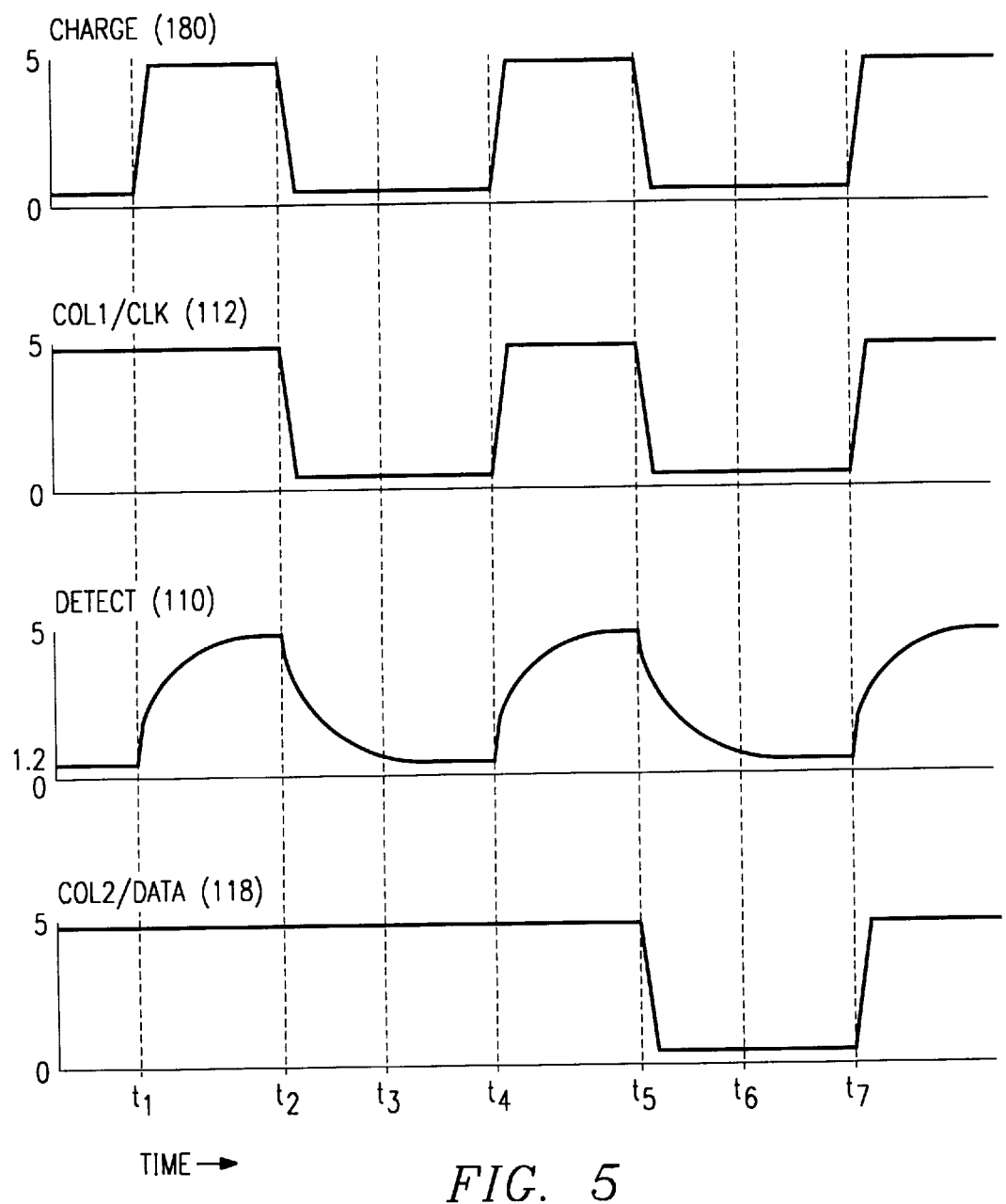
FIG. 5 is a set of waveforms illustrating the capacitive sensing operation of the present invention.

Operation of the circuit shown in FIG. 4 is now described in reference to FIGS. 4 and 5.

The waveforms illustrated in FIG. 5 show signal amplitude as a function of time. There will be a voltage drop across each of the diodes of about 0.7 volt but for simplicity this is not reflected in the FIG. 5 waveforms. The amplitude is in the range of 0 to 5 volts. The voltage on line 180, the charge line, is held low until time $t_1$. The microprocessor 80, beginning at time $t_1$, raises the voltage on line 180 to a high level, which causes line 110 to follow to a high level. Line 180 is charged rapidly and line 110 is charged more slowly. All column lines, including lines 112 and 118, are maintained at a high voltage level.

The lines 112 and 118 serve dual functions. During the sensing of the capacitor sensor pads, they function as column lines just like the remainder of the lines for the other sensor pads. In a second mode of operation when sensing is not being performed, these lines transfer clock and data signals which are passed through the multiplexer to the keyboard port of the computer via terminals 220. The mode corresponds to the voltage state of the selection line 226.

All of the sensor pads 58–74 are charged to a high voltage state during the time interval from $t_1$ to $t_2$, which is approximately 1 microsecond. At time $t_2$ the microprocessor 80 lowers the voltage on lines 180 and 112. This permits the charge on pad 58 to discharge through resistor 114 which then lowers the voltage on line 110 as indicated. This is an exponential discharge. At time $t_2$ the microprocessor 80 starts a counter and measures the time until the voltage on line 110 reaches the threshold voltage, which is in this example is 1.2 volts. This occurs at time $t_3$. This is a measure of the time required to discharge the sensor pad 58. If no capacitive object is in the vicinity of pad 58, there will be a constant discharge time and this can be recorded during a test or setup period as a reference time. If a capacitive object, such as a fingertip, is proximate the sensor pad 58, the time required for discharge will be longer and this longer time will be measured. If the discharge time becomes greater than the reference time, for example by 10%, then the microprocessor 80 deems that a touch has occurred for sensor pad 58.

The above-described operation is repeated sequentially for each of the remaining sensor pads 60–74. As indicated in FIG. 5, the microprocessor 80 at time $t_4$ raises the voltages on lines 112 and 180 while maintaining the high voltage on line 118. At time $t_5$, the charge line 180 is again lowered and the column line 118 is likewise lowered thereby producing a discharge of sensor pad 60 which is indicated by the falling voltage on detect line 110. The discharge time for pad 60 is measured between time $t_5$ and $t_6$. This process is then repeated for the remainder of the sensor pads.

The discharge time is also measured for the guard ring pad 74. This is done in sequence following pads 58–72. This discharge time is likewise compared to a reference for this pad to determine whether or not an object has affected the capacitance of this pad. If the mouse device is present in the vicinity of any of the sensor pads 58–72, then it will affect the capacitance of the guard ring pad 74. If a detection is indicated for the guard ring pad 74, then the measurements made for the sensor pads 58–72 are ignored because any detection signals are very likely to have been generated by the presence of the mouse device. A finger touch on any of the sensor pads 58–72 generates very little capacitance for the guard ring pad 74. Therefore, the use of the guard ring pad prevents the generation of erroneous touch indications for the sensor pads 58–72.

In FIGS. 1–4, the sensor pads 58–72 with corresponding markers 28–42 are described as selection switches. However, these sensors can be combined to also function as a touch slider input or x-y controls for a function such as cursor position, in effect, replacing the mouse.

Figure 6:
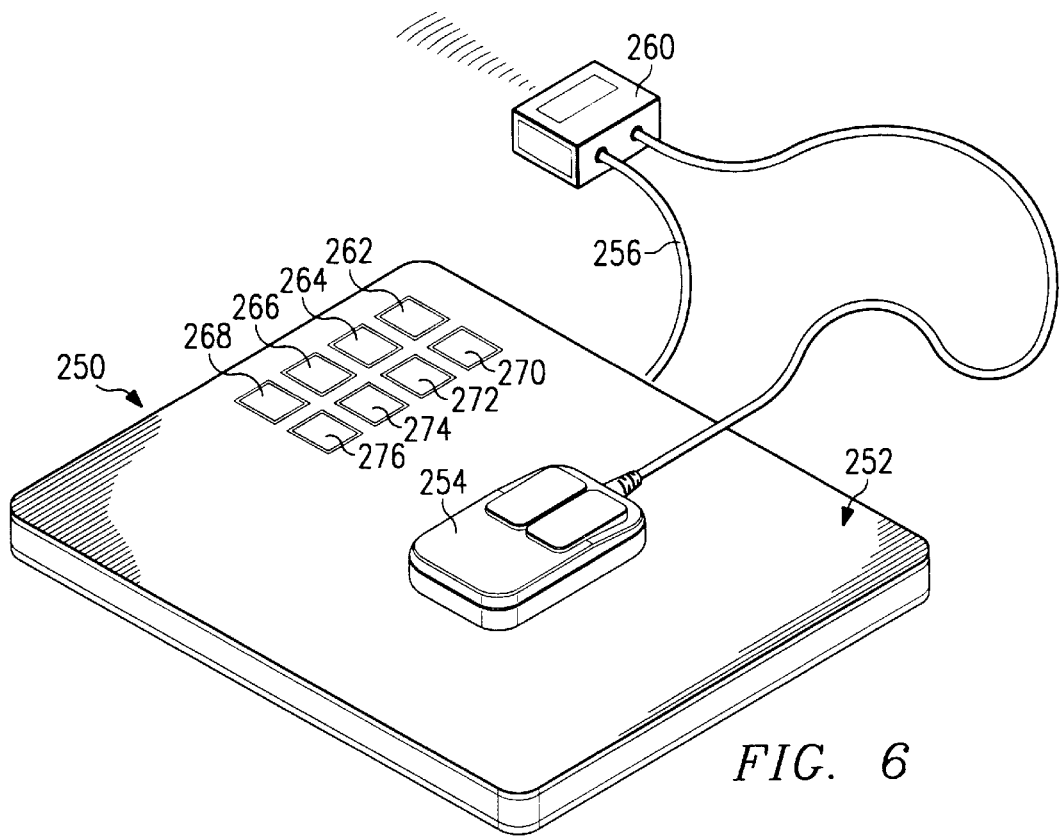
FIG. 6 is a perspective view of an illustration of the present invention utilizing an infrared communications link between the computer input device and a computer.

A still further embodiment of the present invention is illustrated in FIG. 6. A computer input device 250 includes an input device 252 such as previously described in reference to FIGS. 1–4. The device 252 is used in conjunction with a conventional mouse input device 254 which can travel and operate over the entirety of the surface of the device 252. The output of the device 252, which corresponds to the data transmitted through the terminals 220 shown in FIG. 4, is transferred through a cable 256 to an infrared transmitter/receiver unit 260. The unit 260 is provided with batteries and an infrared transmitter and receiver which are well known in the art. Personal computers can now be equipped with infrared communications. The implementation and standards for this communication are well known in the art.

As shown in FIG. 6, the device 252 has markers 262, 264, 266, 268, 270, 272, 274 and 276. These correspond to the markers 28–42 shown in FIG. 1. With the device 250 shown in FIG. 5, a user can operate the mouse 254 and provide the usual mouse inputs to the user's computer system and can concurrently provide a preselected input by touching any of the markers 262–276. The commands and responses to these actions are transmitted through the infrared unit 260 to the computer system.

Figure 7:
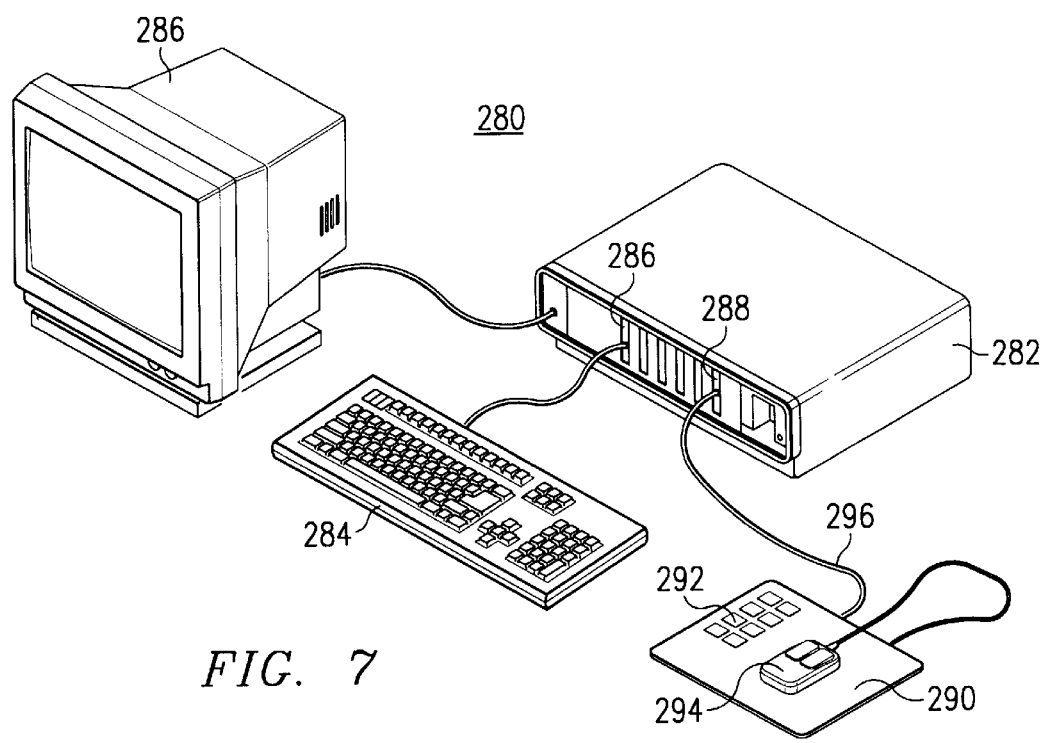
FIG. 7 is an illustration of a computer system having a computer input device in accordance with the present invention wherein the input device is connected through a cable to the mouse port of the computer and the mouse input device is connected to the computer input device of the present invention.
Figure 8:
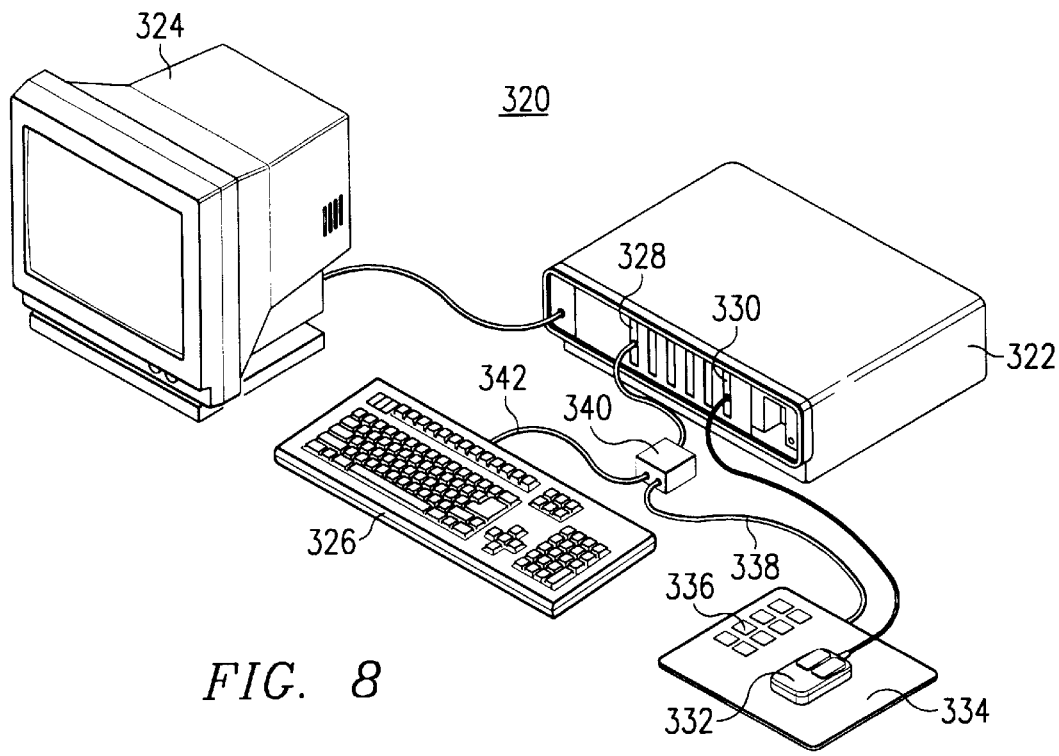
FIG. 8 is an illustration of a computer system having a computer input device in accordance with the present invention wherein the computer input device of the present invention is connected to the keyboard port of the computer and the keyboard of the computer system is connected as an extension of the input device of the present invention.
Figure 9:
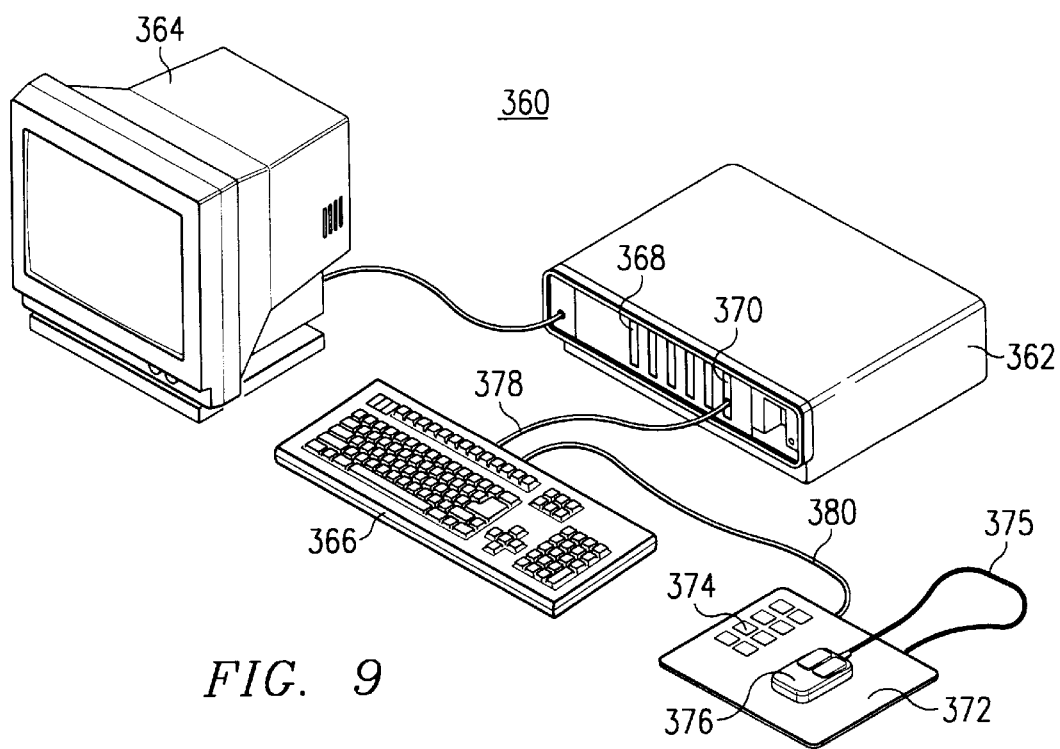
FIG. 9 is an illustration of a computer system having a computer input device in accordance with the present invention wherein the input device of the present invention is connected to a universal serial bus and both the keyboard and mouse input devices are connected to the input device of the present invention.

The present invention can be utilized in various system configurations as shown in FIGS. 7, 8 and 9. A system 280 shown in FIG. 7 includes a processor 282, keyboard 284 and a monitor 286. The processor 282 has a keyboard port 286 and a mouse port 288. It further includes a touch input device 290 in accordance with the present invention and as previously described. The device 290 has markers 292 imprinted over corresponding touch sensor pads. The system 280 includes a conventional mouse input device 294. The cable for the mouse device 294 is connected to a mouse port of the input device 290, and the device 290 itself has a cable 296 for connection to the mouse port 288 of the processor 282. The device 290 includes a barrel connector for interconnecting the mouse device 294 cable, the device 290 and the cable 296.

Referring to FIG. 8, there is shown a system 320 which includes a processor 322, monitor 324 and a keyboard 326. The processor 322 has a keyboard port 328 and a mouse port 330. A conventional mouse device 332 is connected via its own cable to the mouse port 330 of the processor 322. A touch input device 334, in accordance with the present invention, includes a set of markers 336 above corresponding touch sensor pads. The touch input device 334 includes a cable 338 which is joined to a barrel connector 340 that is in turn connected to the keyboard port 328. A keyboard cable 342 extends from the barrel connector 340 to the keyboard 326. The system 320 shown in FIG. 8 corresponds to the electrical configuration shown in FIGS. 1, 2, 3 and 4 above. The microprocessor within the touch input device 334 selectively routes keyboard commands from the keyboard 326 to the keyboard port 328 of the processor 322 while interrupting as required to input touch commands from the device 334 to the keyboard port 328 and ultimately to host software within the processor 322.

A further system configuration 360 is illustrated in FIG. 9. The system 360 includes a processor 362, a monitor 364 and a keyboard 366. The processor 362 includes a keyboard port 368 and a universal serial bus (USB) port 370. The USB is now a defined standard which permits multiple devices to be connected in series to a single port of a computer. The system 360 further includes a touch input device 372 in accordance with the present invention as described herein. The device 372 includes markers 374 located above corresponding touch sensor pads. The keyboard 366, input device 372 and mouse device 376 are connected in series on the USB. A cable 378 provides the direct connection between the USB port 370 and the keyboard 366. A cable 380 provides an extension of this bus between the keyboard 366 and the input device 372. A still further extension of the bus is a cable 375 which is connected to the mouse device 376. The USB permits each device connected thereto to individually communicate to corresponding software within the processor 362.

Figure 10:
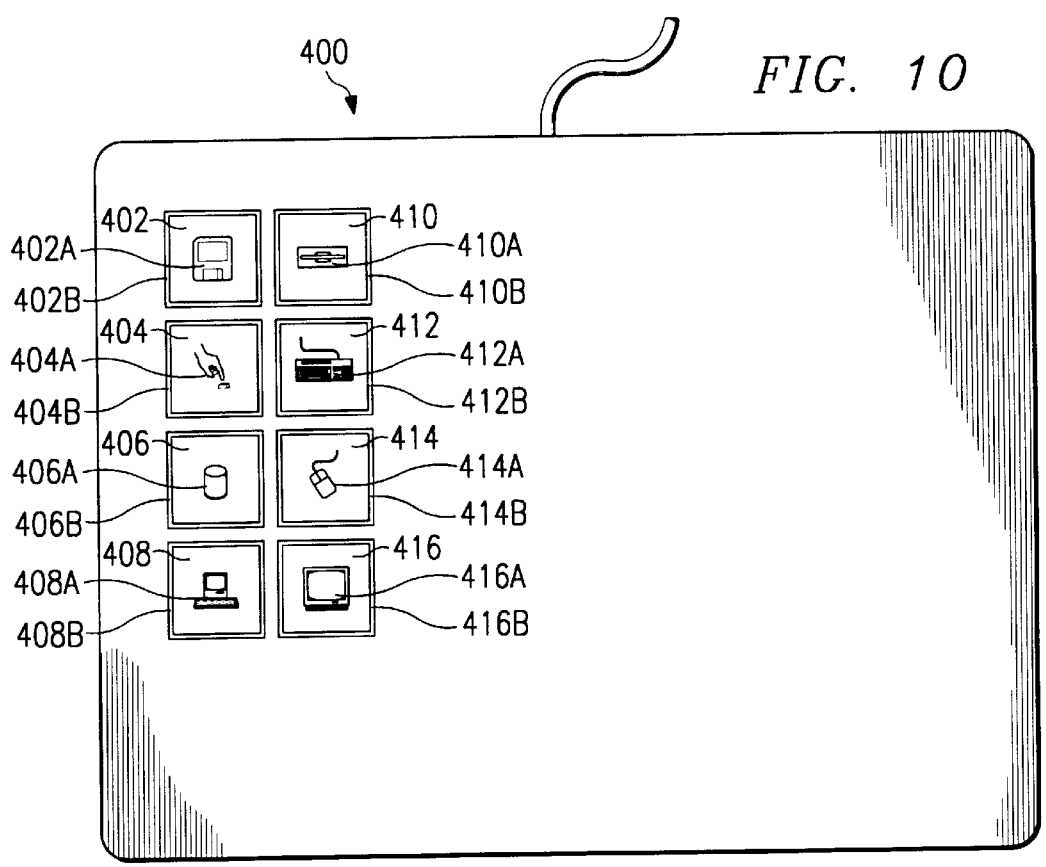
FIG. 10 is a partial illustration of engraved configurations in the form of small indentations in the upper surface of the computer input device for allowing tactile detection of the location for a sensor which is immediately below the engraved surface.

A further aspect of the present invention is illustrated in FIG. 10. An input device 400 corresponds to the device 20 described in reference to FIGS. 1–3. The device 400 has a set of eight markers 402, 404, 406, 408, 410, 412, 414 and 416. Each of these markers is positioned above a corresponding capacitive sensor pad, as described above. An icon is printed at the center of each marker. These include icons 402A–416A. Each icon can represent a function or operation that is carried out with a computer. The periphery of each marker is defined by a shallow engraved groove. These are shown as grooves 402B–416B. Each of the grooves can be felt by a user who moves his fingertip across the surface of the device 400. By feeling of the grooves, a user can determine the location of any one of the eight markers without looking at any of the markers or the device 400. The user can thus enter a command into the computer without changing his visual focus, such as looking at the computer monitor. The device 400 can require an input only when there has been a double touch within a predetermined time on any one of the markers thereby eliminating the possibility of an input being created merely by feeling of the surface of the device 400 to locate the position of a marker.

Figure 11:
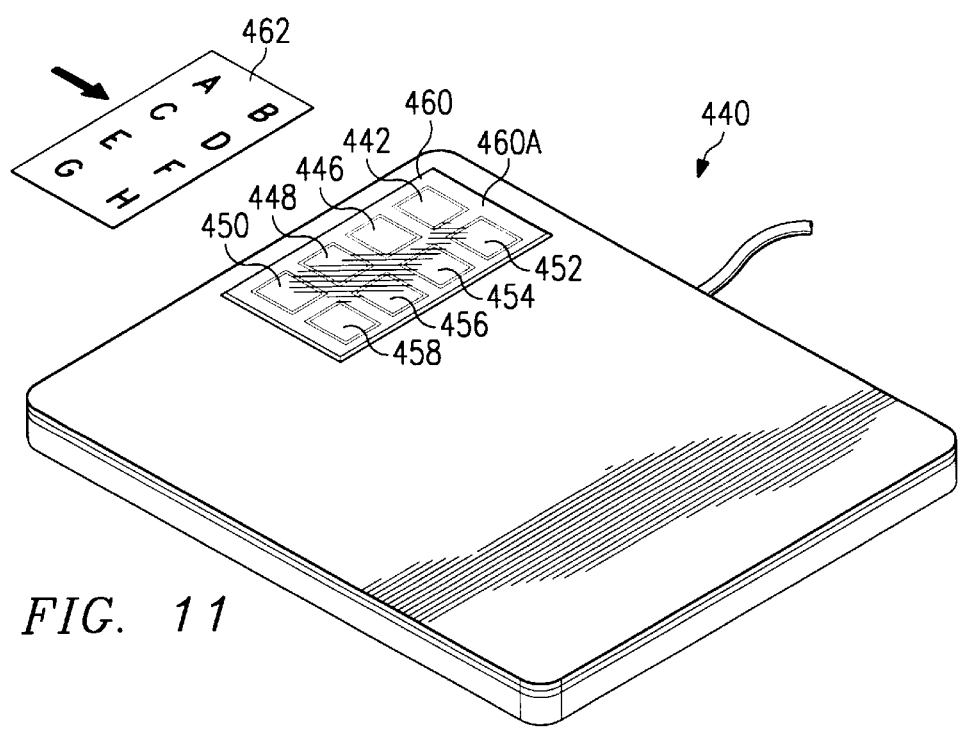
FIG. 11 is a further illustration of an aspect of the present invention wherein a sleeve is positioned over the capacitive touch sensors for receiving a printed sheet having symbols or icons positioned above each capacitive touch sensor for defining a function or operation associated with each sensor.

A still further aspect of the present invention is illustrated in FIG. 11 which includes an input device 440, such as device 20 described above in reference to FIG. 1. The body 440 includes a set of eight markers 442, 446, 448, 450, 452, 454, 456 and 458, such as described above for markers 28–42 in FIG. 1. The body 440 further includes a sleeve 460 which has a transparent cover 460A above the markers 442–458. The sleeve 460 is open on the left side to permit insertion of a sheet 462. The sheet 462 is printed with characters, descriptions or icons that are in positions that correspond to the markers 442–458. As illustrated in FIG. 11, the letters A, B, C, D, E, F, G and H are positioned, respectively, over the markers 442–458 which are in turn, respectively, positioned over a corresponding set of capacitive sensor pads. With the sheet 462 inserted into the sleeve 460 of the body 440, the user can define a particular input to his computer system and represent that input by any character, description or icon. For the described embodiment, the user may have a predefined meaning for E and thus a touch on the E character produces the desired result in the computer system. The computer system itself may be used to print the sheet 462 such that the user has complete flexibility for identifying the functions associated with each of the eight touch sensor pads of the body 440. Icons as shown in FIG. 10 can be used in place of the letters A–H.

Although several embodiments of the invention have been illustrated in the accompanying drawings and described in the foregoing detailed description, it will be understood that the invention is not limited to embodiment as disclosed, but is capable of numerous rearrangements, modifications and substitutions without departing from the scope of the invention.

What we claim is:

1. A computer input device for connection to an input port of a computer and for use in conjunction with a hand-controlled mouse input device, comprising:

a multi-layer body having at least one layer comprising a resilient material, a planar upper surface layer of said body for receiving said mouse device, a plurality of capacitive touch sensors positioned in said body below said planar upper surface layer, wherein said mouse input device can operate above said capacitive touch sensors, an electronic circuit located in said body and connected to said capacitive touch sensors for detecting when a capacitive body comes into proximity to any one of said touch sensors to generate a touch signal corresponding to said one touch sensor upon said detecting, and a communication link from said electronic circuit to said input port of said computer for conveying said touch signals to said computer.

2. A computer input device as recited in claim 1 wherein said touch sensors and said electronic circuit are incorporated with a printed circuit card which is positioned between said one layer of resilient material and said planar upper surface layer of said body.

3. A computer input device as recited in claim 2 including a third layer positioned between said resilient material and said copper surface layer, said third layer having an opening therein for receiving said printed circuit card.

4. A computer input device as recited in claim 1 including a marking on the top surface of said surface layer above each of said capacitive touch sensors for indicating the location of each of said touch sensors.

5. A computer input device as recited in claim 1 including a plurality of engraved indicia on the top surface of said surface layer above each of said capacitive touch sensors for indicating by touch the location of each said touch sensors.

6. A computer input device as recited in claim 1 including a sleeve above said capacitive touch sensors, said sleeve for receiving an insert card having symbols positioned respectively above each of said capacitive touch sensors.

7. A computer input device as recited in claim 1 wherein said communication link is a cable connected to the mouse port of said computer.

8. A computer input device as recited in claim 1 wherein said communication link is an infrared transmitter and receiver for transferring data to and from an infrared port of said computer.

9. A computer input device as recited in claim 1 wherein said communication link is a cable connected to a keyboard port of said computer.

10. A computer input device as recited in claim 1 wherein said communication link is a cable connected to a serial port of said computer.

11. A computer input device as recited in claim 1 wherein said communication link is a cable connected to a port of said computer and said computer input device further includes a port for connecting a keyboard for use with said computer.

12. A computer input device as recited in claim 1 wherein said communication link is a cable connected to a port of said computer and said computer input device further includes a port for connecting a mouse for use with said computer.

13. A computer input device as recited in claim 1 wherein said communication link is a cable connected to a port of said computer and said computer input device further includes a port for connecting a keyboard and mouse port for connecting a mouse for use with said computer.

14. A computer input device as recited in claim 1 including a guard touch sensor which has a portion thereof adjacent each of the other touch sensors.

15. A computer input device as recited in claim 1 including a guard touch sensor which encompasses the periphery of each of said touch sensors.

16. A computer input device for connection to an input port of a computer and for use in conjunction with a hand-controlled mouse input device, comprising:

a multi-layer body having at least one layer comprising a resilient material, a planar upper surface layer of said body for receiving said mouse device, a plurality of user input capacitive touch sensors positioned in said body below said planar upper surface layer, a guard ring touch sensor having at least a portion thereof adjacent each of said user input capacitive touch sensors, an electronic circuit positioned in said body and connected to said user input and guard ring capacitive touch sensors for detecting when a capacitive body comes into proximity to any one of said touch sensors to generate a touch signal corresponding to said one touch sensor upon said detecting, and a communication link from said electronic circuit to a port of said computer for conveying said touch signal to said computer.

17. A computer input device as recited in claim 16 wherein said guard ring touch sensor has a least a portion thereof encompassing each of said user input capacitive touch sensors.

18. A computer input device as recited in claim 16 wherein said touch sensors and said electronic circuit are incorporated with a printed circuit card which is positioned between said one layer of resilient material and said planar upper surface layer of said body.

19. A computer input device as recited in claim 16 including a third layer positioned between said resilient material and said copper surface layer, said third layer having an opening therein for receiving said printed circuit card.

20. A computer input device as recited in claim 16 including a marking on the top surface of said surface layer above each of said capacitive touch sensors for indicating the location of each of said touch sensors.

21. A computer input device as recited in claim 16 including a plurality of engraved indicia on the top surface of said surface layer above each of said capacitive touch sensors for indicating by touch the location of each said touch sensors.

22. A computer input device as recited in claim 16 including a sleeve above said capacitive touch sensors, said sleeve for receiving an insert card having symbols positioned respectively above each of said capacitive touch sensors.

23. A computer input device as recited in claim 16 wherein said communication link is a cable connected to the mouse port of said computer.

24. A computer input device as recited in claim 16 wherein said communication link is an infrared transmitter and receiver for transferring data to and from an infrared port of said computer.

25. A computer input device as recited in claim 16 wherein said communication link is a cable connected to a keyboard port of said computer.

26. A computer input device as recited in claim 16 wherein said communication link is a cable connected to a serial port of said computer.

27. A computer input device as recited in claim 16 wherein said communication link is a cable connected to a port of said computer and said computer input device further includes a port for connecting a keyboard for use with said computer.

* * * * *